United States Patent [19]

Malloy et al.

[11] 4,146,206
[45] Mar. 27, 1979

[54] VALVE CLOSURE MEMBER THRUST AND LOAD COMPENSATOR

[75] Inventors: Edward D. Malloy, Westmont, N.J.; William L. Parsons, Jr., Drexel Hill, Pa.

[73] Assignee: Garlock Inc., Rochester, N.Y.

[21] Appl. No.: 776,863

[22] Filed: Mar. 11, 1977

[51] Int. Cl.² ............................ F16K 1/22; F16K 25/00
[52] U.S. Cl. ............................... 251/84; 251/306; 251/308
[58] Field of Search ........................ 251/306–308, 251/315, 305, 309, 317, 160, 164, 165, 192, 304, 310, 311, 312, 313, 314, 316, 84; 403/292

[56] References Cited

U.S. PATENT DOCUMENTS

| | | | |
|---|---|---|---|
| 1,013,861 | 1/1912 | Chandler | 251/165 |
| 2,058,996 | 10/1936 | Kollberg | 251/306 |
| 2,576,300 | 11/1951 | Kreiner | 251/164 |
| 3,011,757 | 12/1961 | Miller | 251/192 |
| 3,172,192 | 3/1965 | Dresden | 251/315 |
| 3,269,128 | 8/1966 | Rusche | 403/292 |
| 3,277,919 | 10/1966 | Piccardo | 251/315 |
| 3,367,359 | 2/1968 | Johnson | 251/315 |
| 3,384,337 | 5/1968 | Brown | 251/315 |
| 3,424,190 | 1/1969 | Wolfensperger | 251/315 |
| 3,447,780 | 6/1969 | Hobson, Jr. | 251/306 |
| 3,497,180 | 2/1970 | Ryey | 251/306 |
| 3,539,148 | 11/1970 | Boos | 251/306 |
| 3,612,483 | 10/1971 | Pool | 251/315 |
| 3,633,872 | 1/1972 | Wright | 251/306 |
| 3,666,236 | 5/1972 | Gachot | 251/306 |
| 3,974,855 | 8/1976 | Webb | 251/307 |

Primary Examiner—William R. Cline
Assistant Examiner—H. Jay Spiegel
Attorney, Agent, or Firm—Woodcock, Washburn, Kurtz & Mackiewicz

[57] ABSTRACT

The valve closure member thrust and load compensator is applicable to butterfly valves and the like and is a mechanical arrangement which directly supports the weight of the closure member or disc and simultaneously supports the valve shaft and through means of an adjusting screw balances the load and centralizes the sealing forces within the valve body.

9 Claims, 4 Drawing Figures

VALVE CLOSURE MEMBER THRUST AND LOAD COMPENSATOR

BACKGROUND OF THE INVENTION

The present invention is applicable to butterfly valves and the like such for example as disclosed in U.S. Pat. No. 3,376,014-Buckley et al, U.S. Pat. No. 3,447,780-Hobson, Jr. and U.S. Pat. No. 3,837,620-Malloy et al.

In some butterfly valve constructions it is impractical due to size and other manufacturing considerations to have the valve closure member or disc fixed to the shaft. When the valve closure member or disc is not fixed to the shaft, the full weight of the disc exerts a downward force when mounted in other than a horizontal position. This force frequently brings about excessive wear and increased friction between the disc and the valve seat or liner material, as well as causing an imbalance in the sealing force around the disc. As the valve increases in size, this condition becomes more acute and is particularly accentuated where softer sealing materials are used.

When the disc is supported on the main shaft or is supported at its lower end by a removable stud shaft, the axial position of the disc relative to the valve seat may be adjusted by means of an externally accessible adjusting screw operable to apply a force to the end of the supporting shaft. Thus movement of the shaft will in turn cause movement of the disc which is supported on the shaft. Examples of arrangements of this type are disclosed in U.S. Pat. No. 3,314,642 - Kautz et al, U.S. Pat. No. 3,633,872 - Wright. Other patents showing the use of a plug for supporting the shaft are U.S. Pat. No. 3,497,180 - Ryey, U.S. Pat. No. 3,539,148 - Boos, Jr. and U.S. Pat. No. 3,703,910 - Smith.

SUMMARY OF THE INVENTION

The present invention is particularly applicable to butterfly valves or similar type valves where the closure member or disc is not fixed to the shaft and thus the full weight of the disc exerts a downward force on the valve seat when the valve is mounted in other than a horizontal position.

The present invention is directed to a valve of the type including a valve body having a valve seat and at least one opening for receiving pivotal shaft means of a valve closure member positioned within the valve body for rotating the valve closure member between open and closed positions with respect to the valve seat and an improved thrust and load compensator for the valve member. The thrust and load compensator comprises a thrust bearing sleeve positioned on one end of the pivotal shaft means in the opening in the valve body and non-rotatably coupled to the valve closure member, thrust bearing means positioned in alignment with the opening in the valve body for supporting both the thrust bearing sleeve and the pivotal shaft means, and means for adjusting the position of the thrust bearing means axially of the opening in the valve body for centralizing the load forces with respect to the valve seat. The thrust bearing means includes a thrust bearing engaging the thrust bearing sleeve to support the valve closure member, a thrust bearing pad positioned for supporting the thrust bearing, means for preventing rotation of the thrust bearing with respect to the thrust bearing pad, and means for preventing rotation of the thrust bearing pad with respect to the valve body.

More specifically, butterfly valves constructed in accordance with the present invention include a valve body having a cylindrical bore with diametrically opposed openings for receiving pivotal shaft means and a plastic resin liner positioned in the cylindrical bore of the valve body. The liner includes a tubular portion having opposed openings adapted for alignment with the openings in the valve body and pivotal shaft means extending into the openings of the valve body and the liner. A butterfly disc is slideably positioned on the pivotal shaft means for rotation with the shaft means between open and closed positions within the tubular portion of the liner and the butterfly disc has a diameter related to that of the tubular portion of the liner to provide a substantially interference fit therebetween when the butterfly disc is in the closed position. A thrust bearing sleeve is positioned on one end of the pivotal shaft and in the adjacent opening in the valve body. The thrust bearing sleeve is non-rotatably coupled to the butterfly disc and supports the butterfly disc axially of the pivotal shaft. Thrust bearing means is positioned in the adjacent opening in the valve body and supports both the thrust bearing sleeve and the pivotal shaft. Means is provided for adjusting the position of the thrust bearing means axially of the opening in the valve body simultaneously to adjust the butterfly disc for balancing the load and centralizing the sealing forces within the liner.

For a more detailed explanation of the invention and for further objects and advantages thereof, reference is to be had to the following description taken in conjunction with the accompanying drawings.

DESCRIPTION OF THE PREFERRED EMBODIMENT OF THE INVENTION

Figure 1:
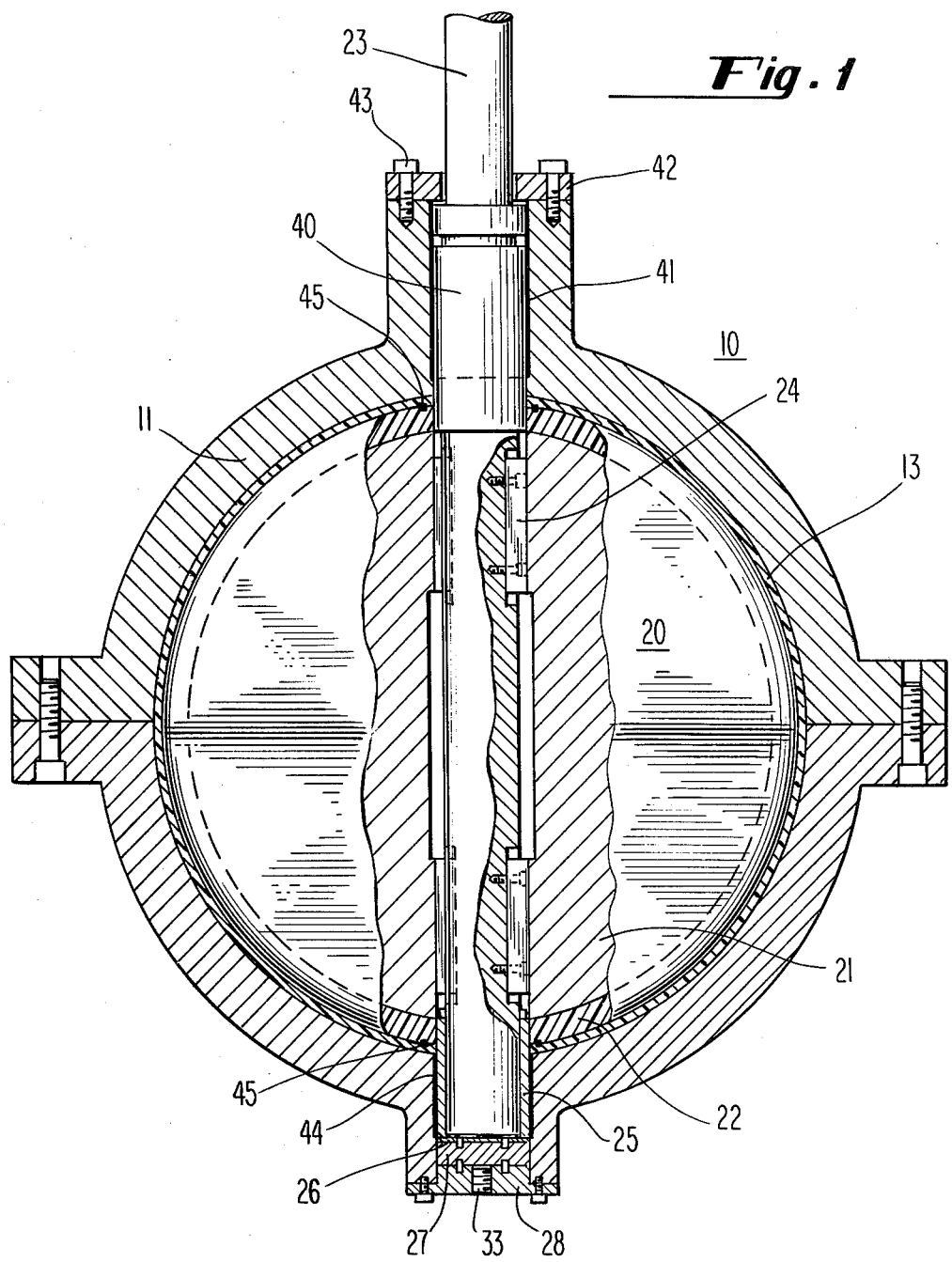
FIG. 1 is a vertical sectional view of a butterfly valve embodying the present invention with portions thereof broken away for clarity.

Referring to FIG. 1 of the drawings there is illustrated a butterfly valve 10 embodying the present invention and having portions thereof broken away for purposes of clarity. The valve 10 includes a body 11 having a cylindrical bore with diametrically opposed openings for receiving pivot means for the valve closure member. The valve body 11 is of conventional construction and may comprise a single member or it may comprise two parts split horizontally across its diameter as shown in FIG. 1. The cylindrical bore of the metal valve body is provided with valve seat means preferably in the form of a plastic resin liner or lining 13. The liner 13 preferably is made from a fluorocarbon resin such as polytetrafluoroethylene (PTFE) and is selected because of its high resistance to corrosive fluids. It is to be understood that other resilient materials may be used so long as they are compatible with the fluid being controlled by the valve. The liner 13 has a tubular portion adapted to be positioned in the cylindrical bore of the valve body 11 and has end flanges, not shown, extending radially outward from the tubular portion. The tubular portion may have a resilient backing means as disclosed in the aforesaid U.S. Pat. No. 3,447,780.

As shown in FIG. 1 in the presently preferred embodiment the valve closure member is a substantially rigid plastic resin encapsulated butterfly disc 20 positioned within the plastic resin liner 13 on the diameter passing through the aligned openings therein. The encapsulated disc 20 comprises a metallic core or disc insert 21 which may be made from any suitable metallic material having the required strength meeting the operating demand such for example as ductile iron or carbon and stainless steels and the like. The plastic resin coating 22 is applied to the metal disc insert 21 by encapsulation to obtain practical thickness and meet the required dimension factor. The resin coating 22 preferably is a fluorocarbon resin such as PTFE or other suitable material. The encapsulated disc 20 is adapted to have an interference fit with the inside diameter of the tubular portion of the liner 13. As may be seen in FIG. 1 the disc 20 is adapted for rotation with the pivotal shaft means 23 by means of key members 24. The key members 24 provide for rotational movement of the disc 20. However the disc is free to move axially of the shaft 23 and thus the shaft 23 does not support the disc 20 when the valve is mounted in a vertical position as shown in FIG. 1.

Figure 2:
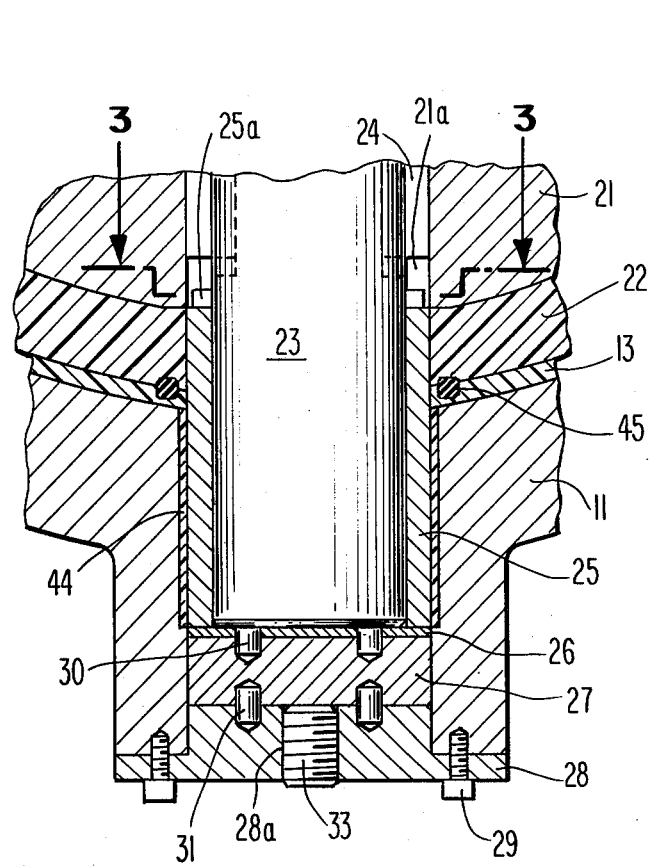
FIG. 2 is a fractional view on enlarged scale of the valve disc thrust and load compensator construction shown at the lower end of FIG. 1.
Figure 3:
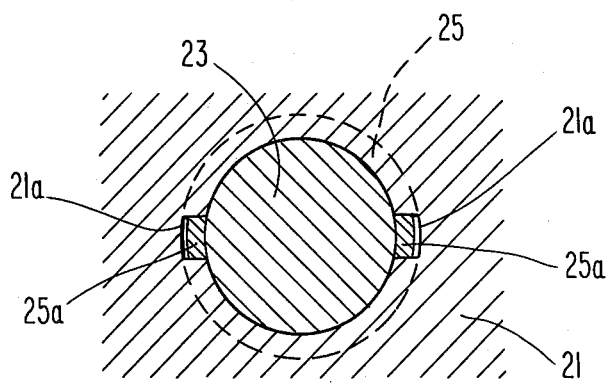
FIG. 3 is a sectional view taken along the lines 3—3 in FIG. 2.
Figure 4:
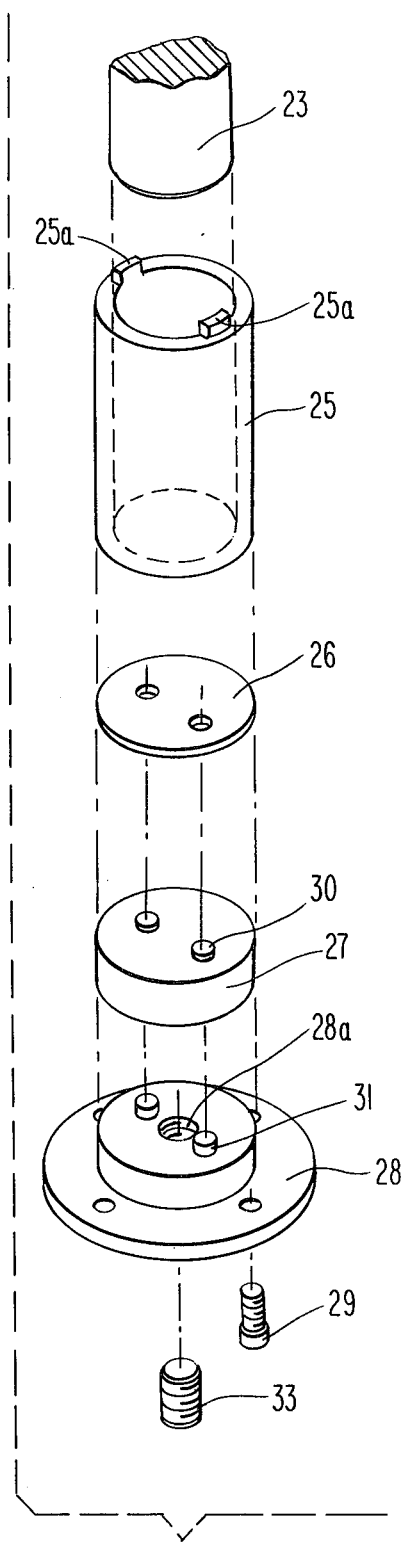
FIG. 4 is an exploded view of the thrust and load compensator construction shown in FIGS. 1 and 2.

The novel disc thrust and load compensator construction is best seen in FIG. 2 and will now be described. The thrust bearing sleeve 25 on the lower end of the shaft 23 supports the disc 20 against a thrust bearing 26. The thrust bearing sleeve 25 is keyed into the disc insert 21 and rotates with the disc 20 and the shaft 23 against the thrust bearing 26. As may be seen in FIGS. 2–4 the thrust bearing sleeve 25 is provided at the upper end with a pair of projections or keys 25a which are adapted to extend into a corresponding pair of notches or slots 21a, FIGS. 2 and 3, on the disc insert 21. Thus it will be seen that the weight of the disc 20 is supported directly by the thrust bearing sleeve 25 which in turn is supported against the thrust bearing 26. The weight of the shaft 23 is supported simultaneously by the same thrust bearing 26, FIG. 2. The thrust bearing 26 is backed up by a thrust bearing pad 27 behind which is an end cap 28 which is adapted to be secured to the valve body 11 as by cap screws 29. The thrust bearing 26 is prevented from rotating by means of two dowel pins 30 which are located in the thrust bearing pad 27. The thrust bearing pad 27 is prevented from rotating by means of a pair of dowel pins 31 located in the end cap 28. The end cap 28, threaded at 28a, carries an adjusting screw 33 which applies a force to the thrust bearing pad 27 which in turn supports the thrust bearing 26. Thus it will be seen that adjustment of the adjusting screw 33 will apply force to the thrust bearing 26 which will adjust the position of the disc 20 to balance the load and centralize the sealing forces within the valve liner. This action provides for increased valve life by elimination of the wear brought about by the downward forces caused by the disc on the valve liner and the valve operation will also be eased because of the centralization of the load forces within the liner.

As shown in FIG. 1 the upper end of the shaft 23 is adapted to extend into a bearing sleeve 40 which is positioned in the opening at the upper end of the valve body 11. A bushing 41 preferably is inserted in the opening between the valve body and the bearing sleeve 40. The bearing sleeve 40 is adapted to be held in position within the opening in the valve body by means of an end cap 42 which is secured to the valve body 11 by cap screws 43. A similar bushing 44 is adapted to be inserted into the lower opposed opening in the valve body 11 and in engagement with the outer surface of the thrust bearing sleeve 25, FIGS. 1 and 2. Suitable sealing means is provided at the opposite ends of the valve disc 20 between the plastic resin covering 22 on the valve disc and the plastic resin liner 13. The sealing means have been illustrated as a pair of sealing rings 45. However, other sealing arrangements may be utilized such for example as disclosed in our aforesaid U.S. Pat. No. 3,837,620 or in the aforesaid U.S. Pat. Nos. 3,376,014 or 3,447,780.

While the present invention has been described in connection with a preferred form of the invention where the valve lining is made of fluorocarbon resin such as PTFE it is to be understood that the invention is not limited to valve linings of this construction or material but is also applicable to other linings which may be plastic or an elastomer. It is further to be understood that the invention is also applicable to valves without liners and where the valve disc is seated directly against the inner surface of the valve body. In valves of this type the valve disc is generally provided with a circumferential recess or groove extending completely about its periphery with an O-ring formed of an elastomeric material within the recess. In valves of this type it is the resilient O-ring on the valve disc which engages the valve seat on the cylindrical bore of the valve body. Also, the thrust and load compensator device of the present invention is not limited to butterfly valves but is also applicable to ball valves and the like such as in U.S. Pat. No. 3,073,336, which has a rotatable valve member positioned within a valve body and movable between open and closed positions. It is further to be understood that the present invention is not limited to constructions where the shaft is keyed to the valve closure member. It is also applicable to arrangements where the shaft is so shaped, for example by a square cross-section, to cause the valve member to rotate with the shaft but at the same time the valve member is slideable on the shaft.

It is to be understood that the invention is not limited to the specific arrangement shown and that changes and modifications may be made within the scope of the appended claims.

What is claimed is:

1. In a valve of the type including a valve body having a valve seat and at least one opening for receiving pivotal shaft means of a valve closure member positioned within the valve body for rotating the valve closure member between open and closed positions, an improved thrust and load compensator for the valve closure member comprising:

a thrust bearing sleeve positioned about one end of the pivotal shaft means in the opening in the valve body and non-rotatably coupled to the valve closure member;

thrust bearing means positioned in alignment with the opening in the valve body for engaging said thrust bearing sleeve thereby to support said valve closure member wherein said thrust bearing means includes a thrust bearing engaging both said thrust bearing sleeve and the pivotal shaft means, and means for preventing rotation of said thrust bearing; and means for adjusting the position of said thrust bearing means axially of the opening in the valve body for centralizing the load forces with respect to the valve seat.

2. In a valve of the type according to claim 1 wherein said thrust bearing means includes a thrust bearing engaging both said thrust bearing sleeve and the pivotal shaft means, and means for preventing rotation of said thrust bearing.

3. In a valve of the type according to claim 1 wherein said thrust bearing means includes a thrust bearing pad positioned for supporting said thrust bearing, means for preventing rotation of said thrust bearing with respect to said thrust bearing pad, and means for preventing rotation of said thrust bearing pad with respect to the valve body.

4. In a valve of the type according to claim 3 wherein said means for adjusting the position of said thrust bearing means axially of the opening in the valve body includes an end cap secured to the valve body and covering the opening therein, and threaded means carried by said end cap and movable axially of the opening in the valve body to adjust the position of said thrust bearing pad and said thrust bearing.

5. A butterfly valve having an improved thrust and load compensator comprising:
- a valve body having a cylindrical bore with diametrically opposed openings for receiving pivotal shaft means;
- a plastic resin liner positioned in the cylindrical bore of said valve body, said liner including a tubular portion having opposed openings adapted for alignment with the openings in said valve body;
- pivotal shaft means extending into said openings of said valve body and said liner;
- a butterfly disc slidably positioned on said pivotal shaft means for rotation with said shaft means between open and closed positions within said tubular portion of said liner, said butterfly disc having a diameter related to that of said tubular portion of said liner to provide a substantially interference fit therebetween when said butterfly disc is in the closed position;
- a thrust bearing sleeve slidably positioned on one end of said pivotal shaft and in the adjacent opening in said valve body, said thrust bearing sleeve being non-rotatably coupled to said butterfly disc and supporting said butterfly disc axially of said pivotal shaft;
- thrust bearing means positioned in alignment with said adjacent opening in said valve body and engaging said thrust bearing sleeve for supporting said butterfly disc wherein said thrust bearing means includes a thrust bearing engaging both said thrust bearing sleeve and the pivotal shaft means, and means for preventing rotation of said thrust bearing; and
- means for adjusting the position of said thrust bearing means axially of said opening in said valve body and for simultaneously adjusting said butterfly disc for balancing the load and centralizing the sealing forces within said liner.

6. A butterfly valve according to claim 5 wherein said thrust bearing means includes a thrust bearing engaging both said thrust bearing sleeve and the pivotal shaft means, and means for preventing rotation of said thrust bearing.

7. A butterfly valve according to claim 5 wherein said thrust bearing means includes a thrust bearing pad positioned in the opening in the valve body and supporting said thrust bearing, means for preventing rotation of said thrust bearing with respect to said thrust bearing pad, and means for preventing rotation of said thrust bearing pad with respect to the valve body.

8. A butterfly valve according to claim 7 wherein said means for adjusting the position of said thrust bearing means axially of the opening in the valve body includes an end cap secured to the valve body and covering the opening therein, and threaded means carried by said end cap and movable axially of the opening in the valve body to adjust the position of said thrust bearing pad and said thrust bearing.

9. A butterfly valve according to claim 8 further including a bushing non-rotatably disposed in said adjacent opening in said valve body and slidably receiving said thrust bearing sleeve therein.

* * * * *

UNITED STATES PATENT AND TRADEMARK OFFICE
CERTIFICATE OF CORRECTION

PATENT NO. : 4,146,206
DATED : March 27, 1979
INVENTOR(S) : Malloy et al

It is certified that error appears in the above-identified patent and that said Letters Patent are hereby corrected as shown below:

Col. 5, cancel claim 2;

line 8, change "3." to --2.--;

line 15, change "4." to --3.-- and change "3" to --2--;

line 23, change "5." to --4.--.

Col. 6, cancel claim 6;

line 23, change "7." to --5.-- and change "5" to --4--;

line 30, change "8." to --6.-- and change "7" to --5--.

Line 39, change "9." to --7.-- and "8" to --6--.

Signed and Sealed this

Tenth Day of November 1981

[SEAL]

Attest:

GERALD J. MOSSINGHOFF

*Attesting Officer*  *Commissioner of Patents and Trademarks*